United States Patent [19]

Kruszewski

[11] 3,814,843

[45] June 4, 1974

[54] GATED AFC CIRCUIT

[75] Inventor: William Frank Kruszewski, Batavia, N.Y.

[73] Assignee: GTE Sylvania Incorporated, Seneca Falls, N.Y.

[22] Filed: Oct. 2, 1972

[21] Appl. No.: 294,154

[52] U.S. Cl. ...... 178/5.8 AF, 178/7.3 DC, 325/423, 331/20

[51] Int. Cl. ...... H04n 5/50

[58] Field of Search .......... 178/5.8 R, 5.8 A, 5.8 AF, 178/7.3 DC; 325/416–423, 346; 331/20, 34–36

[56] References Cited

UNITED STATES PATENTS 2,713,122 7/1955 Henley .......... 325/423

3,686,574 8/1972 Niman .......... 325/421

*Primary Examiner*—Robert L. Griffin

*Assistant Examiner*—Marc E. Bookbinder

*Attorney, Agent, or Firm*—Norman J. O'Malley; Robert E. Walrath; Cyril A. Krenzer

[57] ABSTRACT

A gated automatic frequency control circuit is illustrated wherein the AFC circuit is gated to develop a frequency error signal during horizontal retrace intervals.

2 Claims, 3 Drawing Figures

GATED AFC CIRCUIT

CROSS-REFERENCE TO RELATED APPLICATION

W. F. Kruszewski et, al., "Automatic Frequency Control Circuitry for a Varactor Tuner System," Ser. No. 108,033, filed Jan. 20, 1971, now U.S. Pat. No. 3699455 and assigned to the same assignee as this application.

BACKGROUND OF THE INVENTION

This invention relates to automatic frequency control (AFC) of the type commonly used in television receivers. An AFC system is a closed loop error correction system which normally controls the frequency of an oscillator in the radio frequency (RF) tuner in response to frequency deviations from the correct intermediate frequency (IF). The error or correction voltage is typically developed by a narrow band frequency discriminator tuned to the correct IF or fine tuning point. This error voltage is applied to the oscillator in the VHF or UHF tuners or both.

Prior art AFC systems, however, suffer from a number of disadvantages. For example, prior art AFC systems may generate harmonics which deleteriously affect operation of the television reciever. One example of harmonic interference that may be found in prior art AFC systems is due to fourth harmonics of the IF video carrier that may be generated by the AFC circuit. These harmonics can beat with the channel 8 RF video carrier to cause interference. Another disadvantage of prior art systms is that loop gain is at least partially dependent on signal content, that is, the correction voltage can change slightly with differing video modulation of the RD carrier. Other disadvantages of prior art systems include less than satisfactory signal-to-noise ratio especially for weak signal operation and other similar disadvantages.

OBJECTS AND SUMMARY OF THE INVENTION

Accordingly, it is a primary object of this invention to obviate the above-noted and other disadvantages of the prior art.

It is a further object to provide an AFC system which reduces the need for harmonic isolation.

It is a further object to provide an AFC system wherein loop gain is independent of video content.

It is a yet further object to provide an AFC system with an improved signal-to-noise ratio.

It is another object to provide an economical high performance AFC system.

In one embodiment of this invention the above and other objects and advantages are achieved in automatic frequency control circuitry for a television receiver which includes frequency discriminator means and gating means. The frequency discriminator means includes input means connected to the intermediate frequency amplifier and output means connected to the tuner of the television receiver for providing an error signal to the tuner in response to frequency deviations of a signal from the intermediate frequency amplifier. The gating means is connected to synchronizing circuitry of the television receiver and to the input means of the frequency discriminator means to enable the input means during retrace periods of the horizontal scanning of the cathode ray tube or to disable the input means during periods when image information is contained in the composite television signal.

DETAILED DESCRIPTION OF THE PREFERRED EMBODIMENTS

For a better understanding of the present invention, together with other and further objects, advantages and capabilities thereof, reference is made to the following disclosure and appended claims in connection with the above-described drawings.

Figure 1:
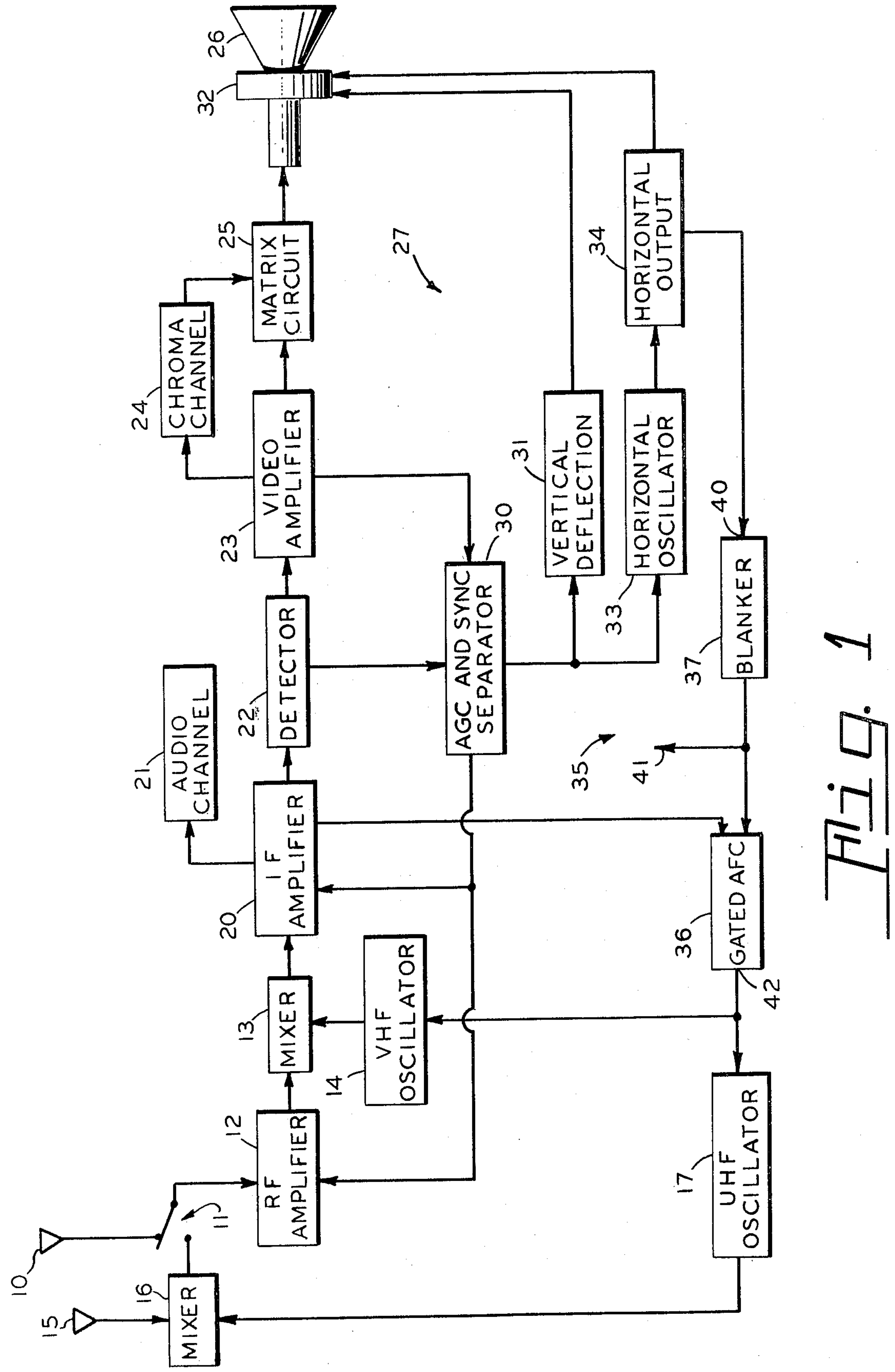
FIG. 1 is a block diagram of a televaision receiver incorporating the invention.

FIG. 1 is a simplified block diagram of a television receiver illustrating the relationship of the invention to the other circuitry in the receiver. The television receiver of FIG. 1 includes a signal receiver for processing a composite television signal received by an input means illustrated as an antenna 10. Antenna 10 is connected via a switch 11 to an input of a radio frequency (RF) amplifier 12 which has an output connected to a mixer 13. A very high frequency (VHF) oscillator 14 has an output connected to another input of mixer 13. Another input means illustrated as an antenna 15 is connected to an input of a mixer 16 which has an output connected to switch 11. An ultra high freqeuncy (UHF) oscillator 17 has an output connected to another input of mixer 16.

Components 10–17 generally comprise an input means and RF tuner. Antennas 10 and 15 can be replaced, for example, by a cable input such as is typically used in closed-circuit or community antenna television systems. In operation a received composite television signal is applied via switch 11 to RF amplifier 12. Mixer 13 and oscillator 14 heterodyne the signal to intermediate frequency (IF). For this purpose oscillator 14 is a variable frequency oscillator with the frequency being adjustable by the channel selector and fine tuning controls.

When UHF reception is desired, switch 11 is switched to its alternative position so that the output of mixer 16 is connected to RF amplifier 12. Mixer 16 and variable frequency oscillator 17 heterodyne the received VHF composite television signal to IF and RF amplifier 12 acts as a first stage of IF amplification. Mixer 13 passes this IF signal without modification. Although no RF amplifier is illustrated in the UHF portion of the tuner, one can be supplied, if desired.

The IF output of mixer 13 is coupled to an input of a multi-stage IF amplifier 20 of the signal receiver. IF amplifier 20 provides an audio output to an input of an audio channel 21 and a video output to an input of a video detector 22. Detector 22 detects the composite video signal and applies it to an input of a video amplifier 23 which has an output whereat a luminance signal is provided. In the case of a color television receiver, the chrominance signal can be coupled via another output of video amplifier 23 to a chroma channel 24 of the signal receiver. The outputs of video amplfier 23 and chroma channel 24 are coupled to a matrix circuit 25 which develops suitable color signals for application to an image display device illustrated as a cathode ray tube (CRT) 26.

Another output of video amplifier 23 is coupled to inputs of synchronizing and automatic gain control (AGC) circuitry 27. Circuitry 27 includes a synchronizing pulse separator and AGC circuit 30 which receives the composite video signal. An output of the sync separator couples separated synchronizing pulses to inputs of vertical and horizontal deflection apparatus. The vertical deflection apparatus includes a vertical deflection circuit 31 connected to the output of the sync separator. Vertical deflection circuit 31 has an output coupled to a vertical deflection winding of a yoke 32 positioned in operable relationship with CRT 26. The horizontal deflection apparatus includes a horizontal oscillator 33 connected to the output of the sync separator and a horizontal outqut circuit 34 connected to horizontal oscillator 33. Horizontal output circuit 34 has an output coupled to a horizontal deflection winding of yoke 32. The vertical and horizontal deflection apparatus effects scanning of CRT 26 in synchronism with the composite television signal.

Another output of detector 22 can be connected to a typical noise suppression circuit or noise gate in sync separator and AGC circuit 30, if desired. The AGC circuit provides AGC signals to RF amplifier 12 and IF amplifier 20 in the usual manner.

Automatic frequency control (AFC) circuitry 35 includes a frequency discriminator means illustrated as a block 36 labeled gated AFC and a gating means illustrated as a blanking means or blanker 37. An output of the synchronizing circuitry such as an output of horizontal output circuit 34 is connected to an input 40 of blanker 37 which has an output connected to an input of frequency discriminator 36. Since typical prior art television receivers often include blanking circuits, blanker 37 can be used both to gate frequency discriminator 36 and to effect blanking or gating of other circuits in the television receiver via a terminal 41 connected to the output of blanker 37. An output of IF amplifier 20 is connected to another input of frequency discriminator 36 which has an output 42 connected to control inputs of one or both of tuner oscillators 14 and 17 for application of an AFC or error signal thereto. AFC circuitry 35 is illustrated in greater detail in FIGS. 2 and 3.

Figure 2:
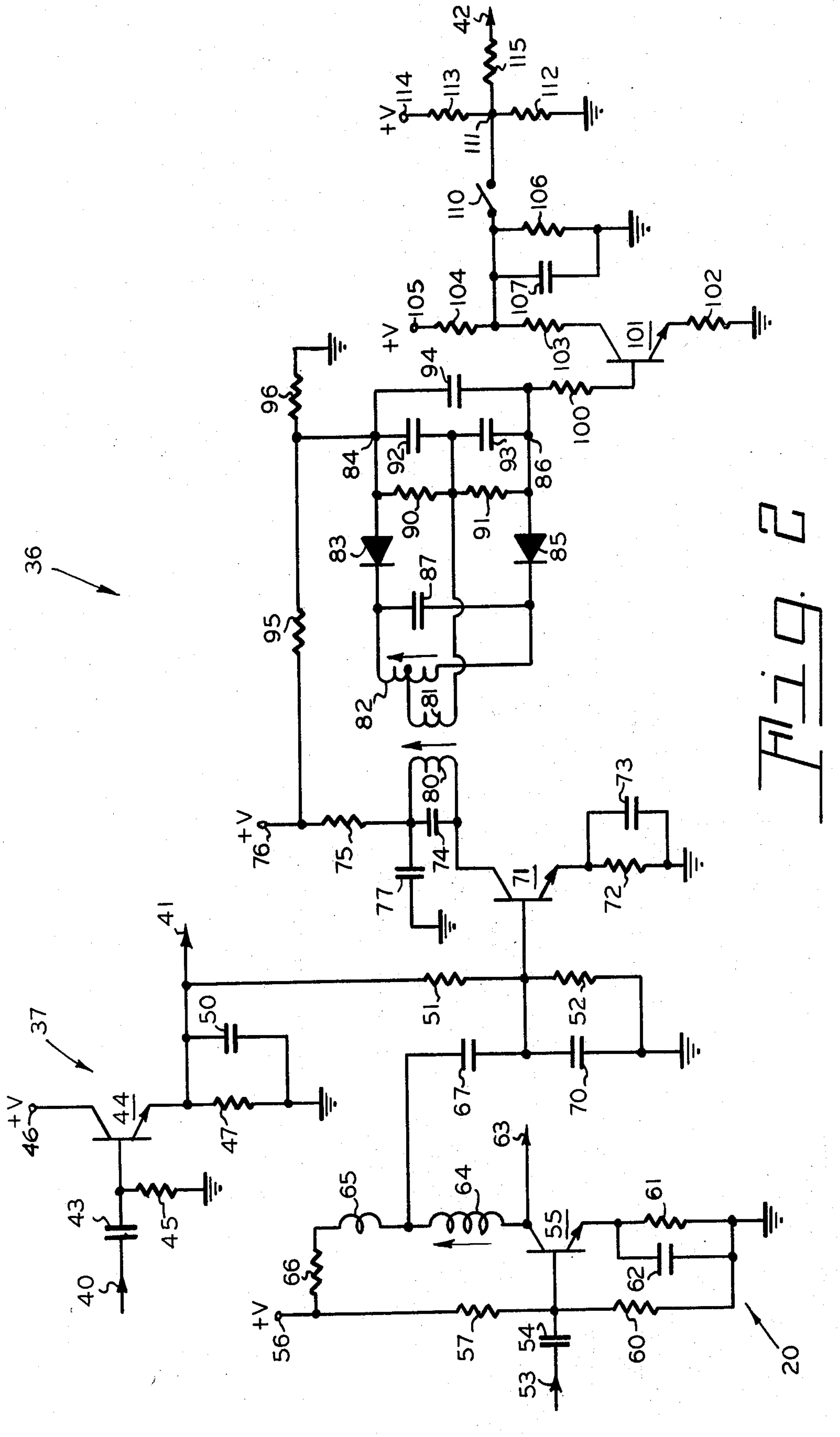
FIG. 2 is a schematic diagram of one embodiment of the invention.

FIG. 2 illustrates one embodiment of the invention for use with more or less conventional tuners. Terminal 40 of gating means 37 is connected via a coupling capacitor 43 to an input of a transistor blanking circuit illustrated as the base of a blanking transistor 44 which is further connected by a resistor 45 to a common conductor illustrated as circuit ground. The collector electrode of transistor 44 is connected to a source of positive potential illustrated as a terminal 46. An output electrode or emitter of transistor 44 is connected to terminal 41 and by a resistor 47 in parallel with a capacitor 50 to ground. The emitter of transistor 44 is further connected by an impedance means illustrated as series connected resistors 51 and 52 to ground.

Only one stage of IF amplifier 20 is illustrated in FIG. 2. A terminal 53 which receives the IF signal from the previous IF amplifier stage is connected via a capacitor 54 to a base of a transistor 55. A source of positive potential illustrated as a terminal 56 is connected by a resistor 57 to the base of transistor 55 which is further connected by a resistor 60 to ground. An emitter of transistor 55 is connected by a resistor 61 in parallel with a capacitor 62 to ground. A collector of transistor 55 is connected to a terminal 63 which can comprise the otuput to detector 22. The collector of transistor 55 is further connected by a tunable winding 64 in series with a winding 65 further in series with a resistor 66 to source 56. The junction between windings 64 and 65, comprising an output of IF amplfier 20, is connected by a voltage divider illustrated as series connected capacitors 67 and 70 to ground.

The junction between capacitors 67 and 70 and the junction between resistors 51 and 52 is connected to an input electrode of an amplifier transistor illustrated as a base of a transistor 71 which has an emitter connected to ground by a resistor 72 in parallel with a capacitor 73. An output electrode or collector of transistor 71 is connected by a capacitor 74 in series with a resistor 75 to a source of positive potential illustrated as a terminal 76. A capacitor 77 is connected between the junction of capacitor 74 and resistor 75 and ground. Transistor 71 and its associated circuitry, resistors 51 and 52, and capacitors 67 and 70 comprise an input means of frequency discriminator 36.

Frequency discriminator 36 further includes a primary winding 80 of a tunable transformer which further includes secondary windings 8! and 82. Winding 80 is connected in parallel with capacitor 74. One end of winding 82 is connected by a diode 83 to a junction 84 while the other end of winding 82 is connected by a diode 85 to a junction 86. A capacitor 87 is connected in parallel with winding 82. A resistor 90 is connected in series with a resistor 91 between junctions 84 and 86 while a capacitor 92 is connected in parallel with resistor 90 and a capacitor 93 is connected in parallel with resistor 91. A capacitor 94 is connected between junctions 84 and 86. One end of winding 81 is connected to a tap of winding 82 while the other end of winding 81 is connected to the junction between resistors 90 and 91. A voltage divider illustrated as a resistor 95 in series with a resistor 96 is connected between source 76 and ground. The junction between resistors 95 and 96 is connected to junction 84. The components connected to the collector of transistor 71, that is, components 74–96, comprise a narrow band frequency discriminator tuned to the desired intermediate frequency of the picture or video carrier, e.g., 45.75 MHz. Frequency deviations from the desired frequency cause an error signal to be developed between junctions 84 and 86.

Junction 86 is connected to an output means of frequency discriminator 36. The output means includes a resistor 100 connected between junction 86 and an input electrode of an amplifier illustrated as a base of a transistor 101 which has an emitter connected by a resistor 102 to ground. An output electrode or collector of transistor 101 is connected by a resistor 103 in series with a resistor 104 to a source of positive potential illustrated as a terminal 105. The junction between resistors 103 and 104 is connected by a resistor 106 in parallel with a capacitor 107 to ground and by a switch 110 to a junction 111. Junction 111 is connected by a resistor 112 to ground, by a resistor 113 to a source of positive potential illustrated as a terminal 114, and by a resistor 115 to output terminal 42.

To understand the operation of the embodiment of FIG. 2, first assume switch 110 is open. Resistors 112 and 113 operate as a voltage divider to provide a fixed bias at terminal 42. Preferably resistors 112 and 113 are large so that they do not deleteriously affect the normal operation of the AFC circuit. With switch 110 open, the fine tuning is adjusted to center the operating range. When switch 110 is closed, the voltage across capacitor 107 due to the voltage divider action of resistors 104 and 106 represents a large correction or error signal which causes a frequency deviation of the IF signal which in turn causes a positive correction voltage to be developed between junctions 84 and 86. This positive correction voltage causes transistor 101 to conduct thereby decreasing the voltage across capacitor 107 to establish a quiescent condition.

A portion of the If signal is tapped from windings 64 and 65, the portion thereof being determined by the turns ratio of the windings. Preferably the signal is taken from the last IF stage where the IF signal IS largest. The tapped-off IF signal is coupled across the voltage divider comprising capacitors 67 and 70 to provide a signal to the frequency discriminator representative of the frequency of the signal in the IF amplifier.

Blanking transistor 44 is normally non-conducting or OFF during trace intervals or periods of the horizontal scanning of CRT 26, when image information is contained in the composite television signal. When transistor 44 is OFF, its emitter is near ground potential. Thus, the base of transistor 71 is biased near ground potential and transistor 71 is biased to a non-conducting or inoperative mode or OFF thereby disabling the input means of frequency discriminator 36.

Upon the initiation of horizontal retrace, horizontal output circuit 34 provides a pulse at input terminal 40 of blanker 37. For example, the flyback pulse can be used for this purpose. The retrace pulse at terminal 40 switches transistor 44 to a conducting mode or ON thereby providing a bias potential via resistors 51 and 52 to bias transistor 71 in a conducting or amplifying mode whereby the input means is enabled to couple the IF signal from the junction of capacitors 67 and 70 to the frequency discriminator. When transistor 71 is in an amplifying mode, it also acts as an IF amplifier for the signal from IF amplifier 20 thereby boosting the IF signal to a level suitable for driving the frequency discriminator. Frequency deviations by the signal from IF amplifier 20 from the desired IF frequency cause an error or correction signal to be developed between junction 84 and 86 which is amplified by transistor 101 to develop an error or correction voltage across capacitor 107. When the retrace interval or period ends, transistors 44 and 71 are again switched OFF to disable the input of frequency discriminator 36. The charge across capacitor 107 developed during retrace, however, provides a continuous error signal at terminal 42 until the next retrace period.

Figure 3:
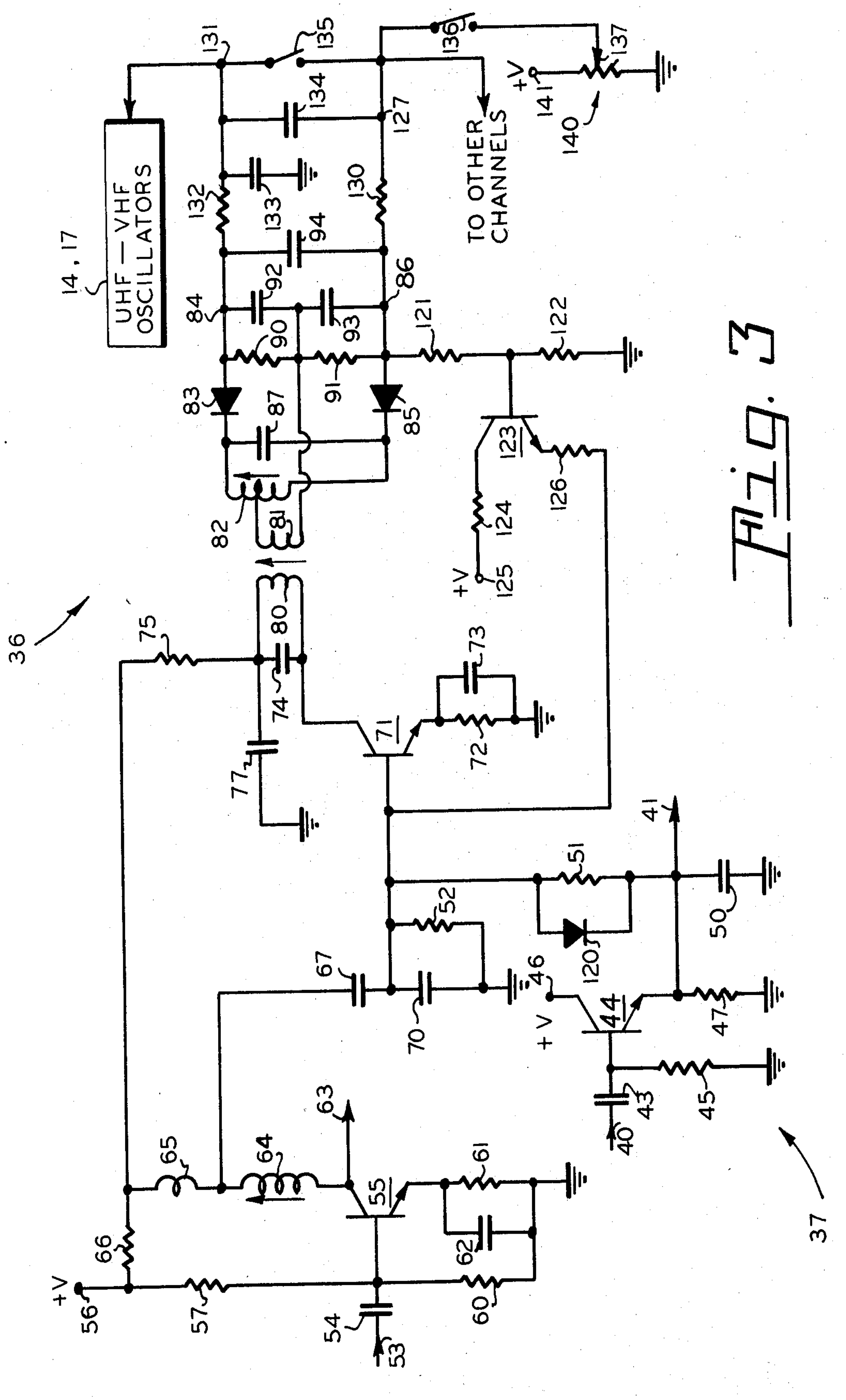
FIG. 3 is a schematic diagram of another embodiment of the invention.

FIG. 3 illustrates another embodiment of the invention more particularly adapted for use with varactor type tuners. Since many of the components and much of the operation of the embodiment of FIG. 3 is the same as FIG. 2, the same reference numerals are used for similar components and only the differences will be described. In FIG. 3, a unidirectional conduction device illustrated as a diode 120 is connected in parallel with resistor 51 to become part of the impedance means connecting transistor 44 to transistor 71. Also, resistor 75 is connected to the junction between resistor 66 and winding 65 instead of source 76 and resistors 95 and 96 are deleted. Junction point 86 is connected by a resistor 121 in series with a resistor 122 to ground. The junction between resistors 121 and 122 is connected to a bias means illustrated as a base of a transistor 123 which has a collector connected by a resistor 124 to a source of positive potential illustrated as a terminal 125. An output electrode or emitter of transistor 123 is connected by a resistor 126 to the base of transistor 71.

Junction 86 is further connected to a junction 127 by a resistor 130 while junction 84 is connected to a junction 131 by a resistor 132. Junction 131 is connected to ground by a capacitor 133 and to junction 127 by a capacitor 134 in parallel with a switch 135. Junctions 127 and 131 represent output terminal 42 of the output means of frequency discriminator 36. Junction 131 is connected to the UHF-VHF oscillators 14, 17 while junction 127 is connected by a switch 136 to a wiper 137 of a potentiometer 140. The resistance element of potentiometer 140 is connected between a source of positive potential illustrated as a terminal 141 and ground.

To establish quiescent conditions, switch 135 is closed thereby shorting junctions 131 and 127. With switch 135 closed, switch 136, which is part of the channel selector, is closed and potentiometer 140 is adjusted to establish the proper bias for a varactor diode in oscillators 14, 17 so that the proper operating or fine tuning point for a particular channel is established. Then switch 136 is opened and switches connected to junction 127 are closed to permit fine turning of potentiometers of other desired channels similar to potentiometer 140. After all of the desired channels are fine tuned, switch 135 is opened.

After switch 135 is opened, the impedance of potentiometer 140 and the potentiometers for the other channels represent a low impedance compared to the corresponding varactor diodes in oscillator 14, 17. Thus, the correction or error voltage is developed at junction 84 while junction 86 remains at a relatively constant potential so that the bias provided by transistor 123 is substantially independent of the correction voltage. With switch 135 open, the correction or error signal developed across capacitor 134 is placed in series with the control voltage of the potentio-meters, such as potentiometer 140, thereby providing an AFC error signal.

Since transistor 123 sets the bias of transistor 71, transistor 44 preferably does not substantially affect the bias of transistor 71. Accordingly, resistor 51 in FIG. 3 is preferably a high impedance. However, since transistor 44 must also switch transistor 71 OFF, diode 120 provides a low impedance path when transistor 44 is OFF to assure cut-off of transistor 71.

While a color television receiver is illustrated in FIG. 1, those skilled in the art will realize that the invention is equally applicable to monochrome television receivers. Also, the gating pulses used to gate the AFC circuit are illustrated as being derived from the horizontal output circuit. While this arrangement is presently preferred, those skilled in the art will realize that the gating pulses could alternatively be derived from the synchronizing pulses from the sync separator. Also, the AFC error signal could be developed during the vertical retrace period, if desired, by gating the AFC circuit with the vertical retrace pulses.

Accordingly, there has been shown and described a novel AFC circuit which provides numerous advantages over the prior art. For example, since the AFC circuit operates only during retrace, objectionable harmonics that may be generated in the AFC circuit are eliminated during trace periods. Also, the loop gain is independent of picture or image content since the IF signal during the retrace period is used to generate the AFC signal. In addition, since the composite television signal has its maximum amplitude during retrace, the signal-to-noise ratio of the composite television signal is higher resulting in a more accurate correction signal. Additionally, noise during image information or trace periods is prevented from reaching the AFC circuit.

While there have been shown and described what are at present considered the preferred embodiments of the invention, it will be obvious to those skilled in the art that various changes and modifications may be made therein without departing from the scope of the invention as defined by the appended claims.

What is claimed is:

1. In a television receiver having a signal receiver for processing a composite television signal and an image display deive connected to said signal receiver for displaying an image derived from said composite television signal, synchronizing circuitry coupled to said signal receiver and to said image display device for effecting scanning of said image display device in synchronism with said composite televiwion signal, said signal receiver having a tuner including at least one variable frequency oscillator and an intermediate frequency amplifier connected to said tuner, improved automatic frequency control circuitry comprising:

frequency discriminator means having input means connected to said intermiediate frequency amplifier and output means connected to said tuner for providing an error signal to said tuner in response to frequency deviations from a desired frequency by a signal provided by said intermediate frequency amplifier, said input means including an amplifier transistor for amplifying signals from said intermediate frequency amplifier;

bias means connected to said amplifier transistor for providing a bias thereto; and gating means including a blanking circuit having an input connected to said synchronizing circuitry, and impedance means connected to an output of said blanking circuit and to said amplifier transistor for disabling said amplifier transistor during periods when image information is contained in said composite television signal, said impedance means including a unidirectional conduction device for providing a high impedance path when said amplifier transistor is in an amplifying mode and a low impedance path when said amplifier transistor is gated to an inoperative mode.

2. Improved automatic frequency control apparatus as defined in claim 1 wherein said impedance means includes a resistor connected between an output of said blanking circuit and an input of said amplifier transistor and said unidirectional conduction device is a diode connected in parallel with said resistor.

* * * * *

PO-1050
(5/69)

UNITED STATES PATENT OFFICE
CERTIFICATE OF CORRECTION

Patent No. 3,814,843 Dated June 4, 1974

Inventor(s) William F. Kruszewski

It is certified that error appears in the above-identified patent and that said Letters Patent are hereby corrected as shown below:

Col. 1, line 33 - delete "systms" and insert -- systems --

Col. 1, line 36 - delete "RD" and insert -- RF --

Col. 2, line 5 - delete "televaision" and insert -- television --

Col. 2, line 50 - delete "VHF" and insert -- UHF --

Col. 3, line 17 - delete "outqut" and insert -- output --

Col. 4, line 4 - delete "otuput" and insert -- output --

Col. 4, line 26 - delete "8!" and insert -- 81 --

Col. 7, Claim 1, line 24 - delete "deive" and insert -- device --

Col. 7, Claim 1, line 29 - delete "televiwion" and insert -- television --

Col. 8, Claim 1, line 3 - delete "intermiediate" and insert -- intermediate --

Signed and sealed this 1st day of October 1974.

(SEAL)
Attest:

McCOY M. GIBSON JR.
Attesting Officer

C. MARSHALL DANN
Commissioner of Patents